United States Patent [19]

Reynolds et al.

[11] Patent Number: 5,118,282

[45] Date of Patent: Jun. 2, 1992

[54] PROCESS FOR THE SELECTIVE NONCATALYTIC REDUCTION OF THE EMISSION OF POLLUTANTS FROM OIL-FIRED BOILER PLANTS

[75] Inventors: Thomas Reynolds, Handeloh; Jan-Dirk Meurer, Rosengarten, both of Fed. Rep. of Germany

[73] Assignee: SAT Chemie GmbH, Fed. Rep. of Germany

[21] Appl. No.: 583,100

[22] Filed: Sep. 17, 1990

[30] Foreign Application Priority Data

Sep. 15, 1989 [DE] Fed. Rep. of Germany ....... 3930851

[51] Int. Cl.⁵ .............................................. F23D 7/00
[52] U.S. Cl. ...................................... 431/4; 110/342; 110/345
[58] Field of Search .................... 431/4; 110/185, 345, 110/342

[56] References Cited

U.S. PATENT DOCUMENTS 4,559,007 12/1985 Hashimoto et al. ..................... 431/4
4,793,268 12/1988 Kukin et al. ..................... 110/345 X
4,998,876 3/1991 Farrar ................................. 431/4 X Primary Examiner—Edward G. Favors
Attorney, Agent, or Firm—Antonelli, Terry Stout & Kraus

[57] ABSTRACT

In this process for the selective noncatalytic reduction of the emission of pollutants from oil-fired boiler plants, chemical compounds which affect the combustion process are admixed, in solutions miscible with the liquid fuel, in metered amounts to the liquid fuel or to the combustion air, among these compounds being salts of organic acids, such as naphthenates, octoates, tallates, salts of sulfonic acids, saturated or unsaturated fatty acids, such as oleic acid, and tall oil, with metals from the group of K, Ba, Mg, Ca, Ce, Mn, Fe; rare earth metals; organometallic compounds, such as carbonyl compounds, mixed cyclopentadienylcarbonyl compounds, or aromatic complexes of the transition metals Fe or Mn. For the purpose of minimizing the $NO_x$ values in the waste gas and the dust load with economical consumption of chemicals, a reducing agent is introduced in metered quantities into the firebox (burner chamber) via a boiler metering system with the use of the liquid or also gaseous carrier stream as an aqueous solution of urea or also urea precursors, such as ammonia or ammonium carbonate, which can also contain further ingredients, such as alkanols, alkanecarboxylic acids, alkanals, or alkanones.

8 Claims, 2 Drawing Sheets

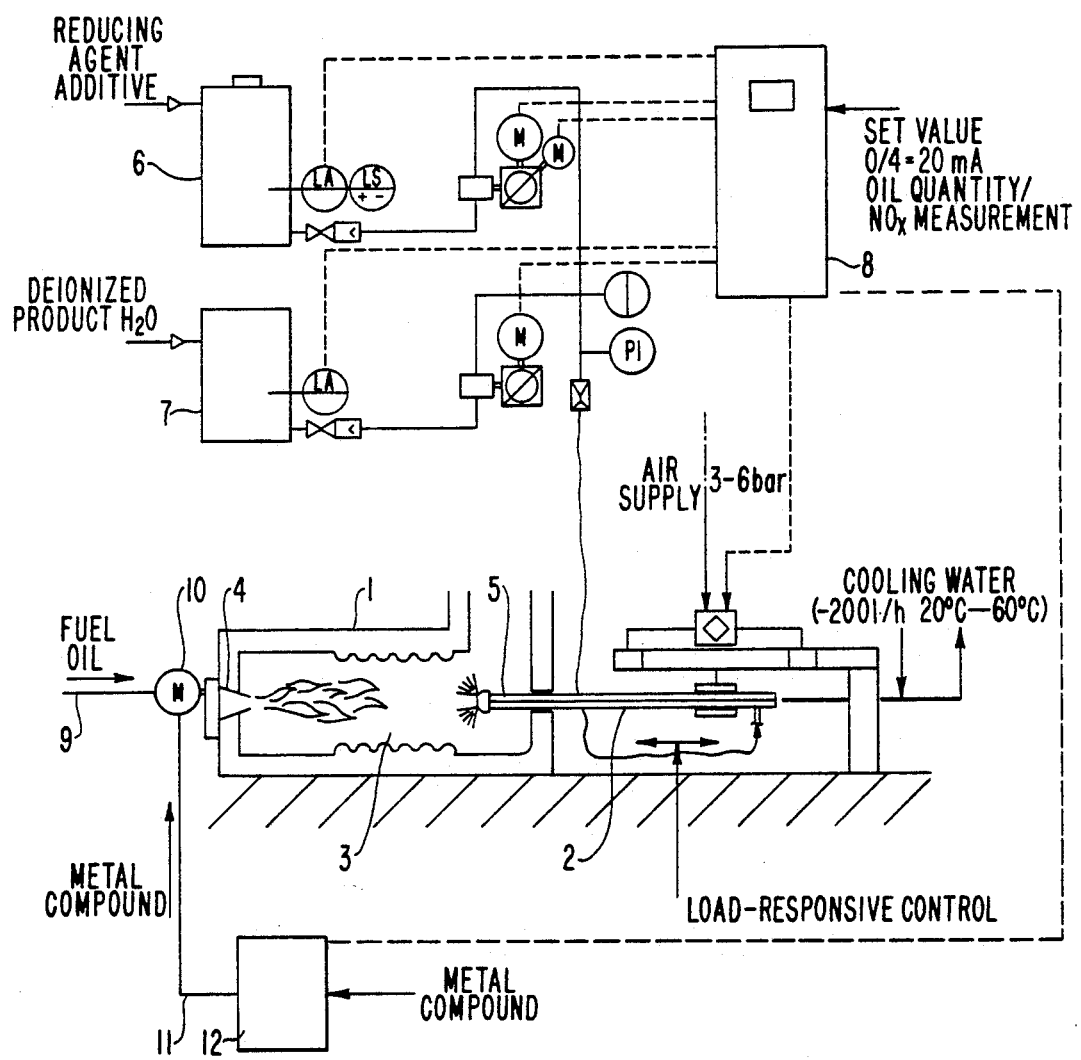

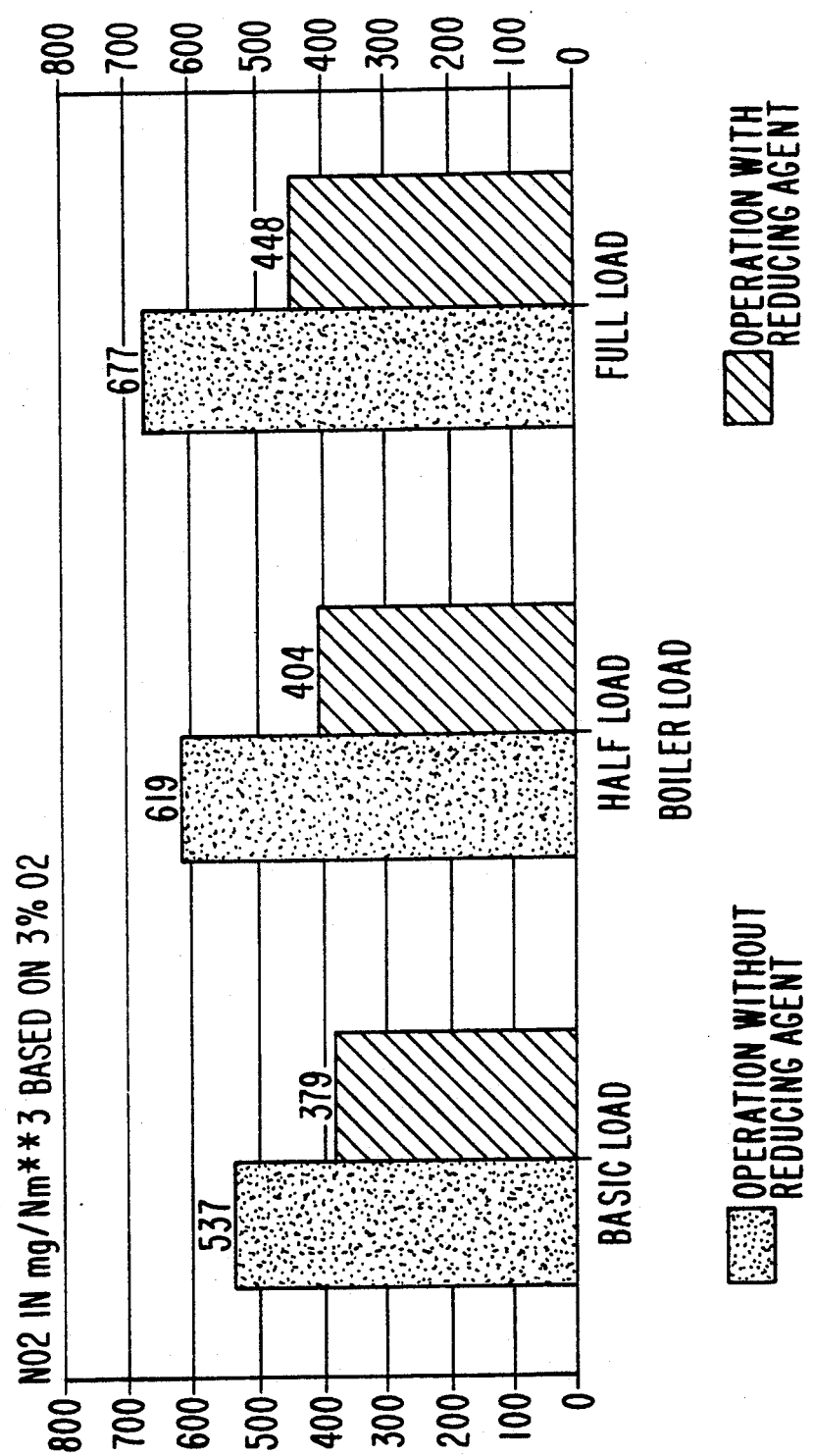

PROCESS FOR THE SELECTIVE NONCATALYTIC REDUCTION OF THE EMISSION OF POLLUTANTS FROM OIL-FIRED BOILER PLANTS

BACKGROUND OF THE INVENTION

This invention relates to a process for the selective noncatalytic reduction of the emission of pollutants from oil-fired boiler plants, with the metered feeding, in solutions miscible with the liquid fuel, of chemical compounds affecting the combustion step to the liquid fuel or to the combustion air; among these chemical compounds are salts of organic acids, such as naphthenates, octoates, tallates, salts of sulfonic acids, saturated or unsaturated fatty acids such as oleic acids, and tall oil, with metals selected from the group consisting of K, Ba, Mg, Ca, Ce, Mn, Fe, and rare earth metals; and organometallic compounds, such as carbonyl compounds, mixed cyclopentadienylcarbonyl compounds, or aromatic complexes of the transition metals Fe or Mn; especially ferrocene, manganocene or their derivatives; for example, ethylferrocene, and together with the metered introduction of a reducing agent into the combustion chamber.

As for the state of the art, attention is invited to an article by V. Hoenig and G. Baumbach, published in the collective volume from the VGB Conference Kraftwerk und Umwelt [Power Plant and the Environment], 1989, pp. 213–217, "Diminishing Pollutants in Heavy Oil Furnaces by Additives: Carbon Black, $SO_3$, NOx"; the introduction to this article, cited hereinbelow, defines the greater technical area and the problem underlying the present invention.

The operators of heavy oil firing installations are likewise confronted by the problem of having to incorporate more stringent pollution control measures due to the critical pollutant emission values for furnace plants introduced in 1983 in the 13th BImSchV (Large-Scale Furnace Plant Regulation, GFAVO) and in 1986 in TA [Industrial Guidelines] "Air". Heavy fuel oil is presently combusted primarily in industry (e.g. steam and, respectively, hot-water generators, process heat) and to a minor extent still in peak load power plants. Most of the heavy oil firings lie within the power range of 50 MWt$_h$ (th = thermal), subject to TA "Air". Only a small number of oil-operated power plants is still in operation within the Federal Republic of Germany within the purview of GFAVO.

Although the total consumption of heavy fuel oil grade S has been reduced by more than one-half since the middle 1970's, the use of this oil is still of interest for some operators. Heavy oil consumption stabilized in the years 1986/87, primarily on account of low oil prices.

(Heavy fuel oil is obtained in crude oil processing and becomes a waste disposal problem if it is no longer possible to utilize heavy fuel oil grade S in a large number of so-called TA "Air" installations.)

Besides the nitric oxide emissions, the emissions of $SO_2$, dust, and acidic flue gas components ($SO_3$, sulfuric acid absorbed on fly dust or flue coke) represent a problem. The critical $SO_2$ values of TA "Air" can be maintained by using an oil low in sulfur (maximally a content of 1%). In order to decrease $NO_x$ emission, these plants presently utilize predominantly primary measures of furnace technology and/or SNCR methods (selective noncatalytic reduction). One possibility of reducing the emissions of carbon black and acidic flue gas components resides in processing the oil with additives. For this purpose, special studies have been conducted at the Institute for Process Technology and Steam Boiler Operations of Stuttgart University (IVD).

U.S. Pat. No. 4,208,386 to Arand et al. discloses contacting combustion waste gases, having a residual oxygen content and a content of $NO_x$, at an elevated temperature with urea, either as a solid or dissolved in a solvent, e.g. an alkanol of 1–3 carbon atoms, water, and a ketone of 3–4 carbon atoms. The urea is to be utilized in an amount effective for substantially reducing the $NO_x$ content in the waste gas. The temperatures to be employed are in a range of at least 1300° F. in case an additional reducing agent is present, and at least 1600° F. in the absence of a further reducing agent.

In another U.S. Pat. No. 4,325,924 to Arand et al., the disclosure relates to contacting $NO_x$- containing combustion waste gases which, however, exhibit an excess of fuel with respect to the stoichiometric oxygen demand, with urea either as a solid or in solution at temperatures of above 1900° F. and in quantities sufficient for a substantial decrease in the content of $NO_x$. In this case, the equivalence ratio of fuel to oxygen has a value of larger than 1:1, especially larger than 1.05:1, and generally less than 1.5:1. The values thus obtained, as indicated in a table, confirm, in dependence on the urea concentration employed, significant reductions in NOx concentration; however, varying amounts of ammonia are likewise observed in the reduced waste gas, depending on the conditions of temperature and concentration utilized.

The use of ammonia for reducing the concentration of nitric oxide (NO) in combustion gases has been disclosed in U.S. Pat. No. 3,900,554. The object on which the patent is based resides in the selective reduction of NO in the presence of residual oxygen in the flue gas. The costs for a reducing agent in such a selective noncatalytic reduction of NO would correspond to the small amounts of NO to be reduced, rather than to the much larger quantities that would be needed for the reduction of NO as well as the residual oxygen.

Published International Patent Application WO 87/02025 concerns a method for reducing $NO_x$ in a waste gas stream from the combustion of carbonaceous fuels with oxygen excess, the formation of carbon-containing emissions being minimized. A dispersion of a dilute aqueous urea solution is injected into the waste gas stream at a temperature of above 2000 F, preferably above 2100° F. The concentration of the urea solution and the droplet size in the dispersion are preferably at least 80% by weight solvent content and a droplet size in the range of 150–10,000 um. An aqueous solution of urea is injected into the said waste gas stream in the presence of an "oxygenated product", for example ethylene glycol, as a droplet dispersion at a temperature of above 1600' F.

SUMMARY OF THE INVENTION

The invention is based on the object of reducing the content of solid partial combustion products (e.g. coke, carbon black, etc.) and of realizing a minimization of the $NO_x$ values in the waste or exhaust gas, with a frugal utilization of chemicals.

The invention is characterized by adding a reducing agent in metered amounts into the firebox (e.g. burner chamber) by way of a boiler metering system with the use of a liquid or also gaseous carrier stream in the form of an aqueous solution of urea or also urea precursors, such as ammonia o ammonium carbonate, which can also contain further ingredients, such as alkanols, alkanecarboxylic acids, alkanals, or alkanones.

By the combination of these measures in conjunction with the process described hereinabove, wherein a solution of chemical compounds affecting the combustion is introduced in metered amounts into the liquid fuel or to the combustion air, it is possible to attain a more favorable range with regard to $NO_x$ formation, with reference to the lambda number of the combustion waste gases, and to realize the object of minimizing the $NO_x$ values in the waste gas with frugal usage of chemicals. The lambda number characterizes the air-fuel mixture and is defined by the ratio of quantity of air introduced to theoretical air demand.

Since the power range of about up to 50 MW of thermal output, subject to TA "Air", involves the preferred range of usage of heavy oil furnaces, a preferred practical application of the invention relates to the utilization of heavy fuel oil (i.e. fuel oil grade S).

The chemical compounds affecting the combustion process are preferably introduced in the form of solutions miscible without miscibility gap with the liquid fuel, by way of a burner metering system controlled in response to the load or also the emissions. Such a process is optimized by the features that, on the one hand, the basic control variable is the $NO_x$ content, while consideration is given to the fact, on the other hand, that furnace plants of the aforementioned type are operated at various load stages.

Solvents used to prepare the solutions of the chemical compounds are, for example, gas oil, kerosine and spindle oil. If ferrocene is used as a chemical compound affecting the combustion process and is to be added to the liquid fuel or the combustion air, a solvent has to be used which comprises aromatic compounds, for example, benzene, toluene, or xylene in order to get the necessary amount of ferrocene into the solution.

A typical example for addition of the metal compounds referring to the primary system of the process is as follows:

15.1% by weight gas oil
7.4% by weight ferrous tallate (comprising certain amounts of ferric tallate)
37.0% by weight calcium sulfonate
40.5% by weight spindle oil Preferred ranges of the resulting metal contents in the primary system (to be mixed into the fuel oil or into the air supply for the burner as sprayed or atomized solution are:

5 to 200, preferably 50 to 60 ppm calcium (Ca)
3 to 200, preferably 5 to 50 ppm iron (Fe)
5 to 200, preferably 10 to 50 ppm Cerium (CE).

If Fe and Ca are used in combination, preferred ranges are 2 to 20 ppm Fe and 15 to 60 ppm Ca. The amount of added metal compound dissolved in one of the aforesaid solvents depends on the kind of fuel. With light fuel oils 3 to 50 ppm of the metal compound calculated as the pure metal are preferred in heavier fuel oil 10 to 200 ppm are preferred.

As reducing agent preferred according to the invention, urea is used in the movable lance, which is designated in the process as the secondary system.

Generally, the addition as an aqueous solution of 1 to 10 preferably 2 to 6 kg urea per t of fuel oil is provided.

Typically, one part of an aqueous 40% by weight urea solution is admixed to six parts by weight of water, which results in a 6% by weight aqueous urea solution, which is fed in the secondary system from the rear into the fire tube (burner on the front side of the fire tube). The aqueous urea solution is sprayed directly into the hot waste gas at temperatures in the region of 800° to 1000° C. in order to ensure an effective reaction.

The set value employed is the amount of fuel required per unit time, which is determined anyway in the operation of such industrial plants for controlling the combustion process and the load.

This value, as well as the $NO_x$ content determined in the waste gas stream are fed, for example, into a computer or a controller acting, on the outlet side, on a metering lance, or lances, movable in the firebox with respect to the burner positions and intended for the reducing agent, namely in such a way that the lowest $NO_x$ content in the waste gas is selected as the operating variable.

Accordingly, a preferred embodiment of the invention resides in controlling the addition of the reducing agent into the firebox by means of a load-dependent boiler metering system with respect to the position in the firebox as well as the concentration of the reducing agent wherein the boiler metering system is regulated by means of a metering lance, or lances, for the reducing agent which are movable with reference to the burner positions.

The reducing agent is injected so that, in dependence on the furnace installation load condition, the $NO_x$ content of the waste gases is minimized at a given carbon black or coke content (= dust content).

The functional scheme of such a system for metering the reducing agent into the firebox (burner chamber) by way of the boiler metering system in the form of an aqueous solution of urea will be further explained below with reference to FIG. 1 of the drawings. At the same time, results will be set forth regarding emission measurements on a steam generator (a double fire-tube, three-gas-pass flue boiler) which can be fired, besides with natural gas, also with heavy fuel oil.

The aqueous urea solution having a content of, for example, 6% by weight of urea is fed via a metering pump, according to the preset amount depending on the load, by way of one movable lance per fire tube into a duct leading from the rear into the fire tube. The required quantities of water for diluting the concentrated, for example, 40% by weight of urea, aqueous urea solution are also preset at the controller acting on a metering pump and fed into said duct. In this procedure the 40% by weight aqueous urea solution employed is diluted to about 20 to 0.5%, preferably 10 to 2% by weight. The diluted aqueous urea solution is sprayed by way of said movable lance into the fire tube.

BRIEF DESCRIPTION OF THE DRAWINGS

FIG. 1 is a schematic of the system for conducting the process of the invention.

FIG. 2 is a graphic comparing operation with and without the reducing agent.

The data of the steam generator and of the oil furnace installations are as follows:

| 1. Data of the Steam Generator | |
|---|---|
| Type of structure: | double fire-tube three-gas-pass flue boiler with super-heater |
| Manufacturer: | Standardkessel |

-continued

|  | Duisburg |
|---|---|
| Permissible boiler output: | 20 t/h |
| Permissible operating excess pressure: | 20 bar |
| Permissible superheated steam temperature: | 285° C. |
| 2. Data of the Oil Furnace Plant | |
| Type of structure: | rotary atomizer |
| Manufacturer: | RAY, Fellbach/ Stuttgart |
| Model: | 2 × BGEC 700 |
| Oil throughput: | 120–700 kg/h |
| Design number: | 18304/82K |

The measuring site was located in the waste gas duct downstream of the end of the boiler and upstream of the flue gas densimeter. The measuring site meets the requirements of VDI Guidelines 2066, page 1, regarding the obstacle-free inlet and outlet routes. At each operating condition, 1–2 measurements were conducted having a duration of 30 minutes.

The following measurements were performed:
Nitrogen oxides: Beckmann
$NO/NO_x$ gas analyzer
measuring principle
chemiluminescence method
Carbon monoxide content: Maihak infrared gas analyzer
Dust Content: Sleeve-type dust meters according
to VDI guidelines 2066,
page 2 (dust measurement gases). The waste gas velocity was determined with the aid of
a Prandtl's pitot tube
and a micromanometer.
Carbon black number: Bacharach carbon black tester and filter paper
$O_2$ Content: Servomex O2 analyzer,
measuring principle
paramagnetism
Flue gas temperature: FeCo thermocouple, comparison measuring
point 0° C. and
digital millivoltmeter The fuel throughputs were determined at the oil counters present.

Furthermore, the ammonia concentration was determined in the waste gas with a detection limit of $0.5 mg/m^3$.

The fuel utilized had the following specifications:

| Additive | 30 ppm by weight of Ca + 7.5 ppm by weight of Fe in the form of oil-soluble compounds | |
|---|---|---|
| Ash | DIN EN 7 | 0.07% by weight |
| Asphaltenes | DIN 51 595 | 0.68% by weight |
| Nitrogen | ASTM | 0.31% by weight |

Table 1 indicates the operating values obtained with aqueous urea solution. Table 2 sets forth, as a comparative test, the operating data without the use of aqueous urea solution as the reducing agent.

The essential results have been compiled in Tables 3 and 4 below. Furthermore, the obtained measured values for the $NH_3$ content are indicated. The values set forth therein refer to dry waste gas, normal conditions, and 3 vol-% of $O_2$.

TABLE 1

| Load Range | Basic Load | Half Load | Full Load |
|---|---|---|---|
| Fuel Oil Consumption at Nominal Load, kg/h |  |  | 1395 |
| Fuel Oil Consumption Determined, kg/h | 675 | 960 | 1330 |
| Furnace Heat Output Based on Nominal Capacity, % | 48.4 | 68.8 | 95.3 |
| Steam Pressure Boiler (Excess Pressure), bar | 15.8–16.3 | 14.5–15.0 | 14.0–14.8 |
| Superheated Steam Temperature, °C. | 235 | 240–245 | 245–250 |
| Feed Water Temperature Before Eco, °C. | 105 | 105 | 105 |
| $O_2$ Content, % | 3.1/3.6 | 3.1/3.1/3.1 | 2.8/2.8 |
| Waste Gas Temperature, °C. | 166/165 | 175/175/175 | 189/189 |
| Dust Content, $mg/m^3n$ | — | — | 53.4/41.7 |
| Same Based on 3% $O_2$, $mg/m^3n$ | — | — | 52.8/41.2 |
|  | — | — | 52.8/41.2 |
| Carbon Black Number | — | — | 1-2/1-2 |
| Oil Derivatives | — | — | None/None |
| CO Content, $mg/m^3n$ | — | — | 10/10 |
| Same Based on 3% $O_2$, $mg/m^3n$ | — | — | 10/10 |
| $NO_x$ Calculated as $NO_2$, $mg/m^3n$ | 396/375 | 400/404/402 | 455/451 |
| Same Based on 3% $O_2$, $mg/m^3n$ | 371/388 | 402/406/404 | 450/446 |
| Consumption - Reducing Agent, l/h | 2.9/2.9 | 11.75/11.75/11.75 | 25.9/25.9 |
| $NH_3$ Content, $mg/m^3n$ | 5.4/5.4 | 14.3/18.4/15.4 | 21.0/16.2 |
| Same Based on 3% $O_2$, $mg/m^3n$ | 5.4/5.6 | 14.4/18.5/15.5 | 20.8/16.0 |

TABLE 2

| Load Range | Basic Load | Half Load | Full Load |
|---|---|---|---|
| Fuel Oil Consumption at Nominal Load, kg/h | | | 1380 |
| Fuel Oil Consumption Determined, kg/h | 666 | 953 | 1316 |
| Furnace Heat Output Based on Nominal Capacity, % | 48.3 | 69.1 | 95.4 |
| Steam Pressure Boiler (Excess Pressure), bar | 13.5–15.0 | 15.7 | 14.7–15.5 |
| Superheated Steam Temperature, °C. | 230–233 | 245–250 | 247–250 |
| Feed Water Temperature Before Eco, °C. | 105 | 105 | 105 |
| $O_2$ Content, % | 3.6 | 3.0 | 3.1/2.8 |
| Waste Gas Temperature, °C. | 166 | 178 | 192/192 |
| Dust Content, mg/$m^3$n | — | — | 58.9/53.6 |
| Same Based on 3% $O_2$, mg/$m^3$n | — | — | 59.2/53.0 |
| Carbon Black Number | — | — | 2/2 |
| Oil Derivatives | — | — | None/None |
| CO Content, mg/$m^3$n | — | — | <10/<10 |
| Same Based on 3% $O_2$, mg/$m^3$n | — | — | <10/<10 |
| $NO_x$ Calculated as $NO_2$, mg/$m^3$n | 519 | 619 | 674/683 |
| Same Based on 3% $O_2$, mg/$m^3$n | 537 | 619 | 678/675 |

TABLE 3

| Emissions | Basic Load | Half Load | Full Load |
|---|---|---|---|
| Dust Content, mg/$m^3$n | — | — | 41.2–52.8 |
| Carbon Black Number | — | — | 1–2 |
| Oil Derivatives | — | — | None |
| Carbon Monoxide Content, mg/$m^3$n | — | — | 10 |
| Nitrogen Dioxide Content, mg/$m^3$n | 371–388 | 402–406 | 446–450 |
| Ammonia Content, mg/$m^3$n | 5.4–5.6 | 14.4–18.5 | 16.0–20.8 |

TABLE 4

| | | | |
|---|---|---|---|
| Dust Content, mg/$m^3$n | — | — | 53.0–59.2 |
| Carbon Black Number | — | — | 2 |
| Oil Derivatives | — | — | None |
| Carbon Monoxide Content, mg/$m^3$n | — | — | <10 |
| Nitrogen Dioxide Content, mg/$m^3$n | 537 | 619 | 675–678 |

As can be derived from Tables 3 and 4, as well as FIG. 2 of the drawing wherein the resultant measured values are graphically illustrated, the nitrogen oxide contents in the waste gas have been lowered by about one-third with the use of aqueous urea solutions as the reducing agent in conjunction with the oil-soluble compounds, calcium sulfonate and iron(II) tallate, admixed into the fuel as additives.

In all load conditions, the critical value of about 450 mg/m3$_n$ for the nitrogen dioxide content in the waste gas, indicated in TA "Air" of Feb. 1986, was maintained.

As for the dust content, with comparable carbon black number and comparable carbon monoxide content, measured values for the dust of 41.7 to 58.9 mg/m3$_n$ were maintained.

The calculated value for the oxide ash yields a number of about 59 mg/m3, i.e. the dust content in the waste gas was almost free of carbon on account of the use of the additive on the primary side.

It is made possible by the process of this invention to enter a favorable region regarding $NO_x$ formation with respect to the lambda number of the combustion waste *gases, and to realize, in combination with the boiler metering system for $NO_x$ reduction, also a minimization of the $NO_x$ values in the waste gas, with effective reduction of the content of solid partial combustion products (coke, carbon black) and frugal use of chemicals.

An apparatus for conducting the process of the invention, as described in the preceding embodiment is schematically shown in FIG. 1, wherein the primary system 1 includes the fuel oil-fired apparatus, e.g. a combustion furnace with burner 4 and a secondary system 2 including the movable lance 5 located at one end of the combustion chamber 3. The aqueous urea solution providing a reducing agent is fed into the combustion chamber via lance 5. This solution is initially prepared by mixing of the concentrated aqueous urea solution from supply unit 6 and of deionized water from metering unit 7, the mixing ratio being regulated by controller unit 8. The air supplied to the lance 5 is also regulated by controller 8.

Fuel oil is fed to the burner via line 9 and mixer 10, wherein a solvent solution of the metal compound affecting the combustion is admixed with the fuel oil. The metal compound is fed via line 11 and the metering unit 12. Units 6, 7 and 12 are controlled by controller 8 and may include pumping and metering mean to provide the quantities of each liquid stream. It will be understood that controller 8 performs two tasks. First, it meters the required amount of metal compound additive into the fuel oil in accordance with a specific load. Secondly, the control unit regulates the input of reducing agent into the waste gas via the secondary system in accordance with the load and the $NO_x$ concentration.

What is claimed is:

1. A process for the selective noncatalytic reduction of the emission of pollutants from an oil-fired boiler plant, with metered introduction of chemical compounds affecting the combustion process to one of the liquid fuel and the combustion air, among said chemical compounds being salts of organic acids, including naphthenates, octoates, tallates, salts of sulfonic acids, saturated or unsaturated fatty acids, including oleic acids, and tall oil with metals selected from the group consisting of K, Ba, Mg, Ca, Ce, Mn, Fe; and rare earth metals; organometallic compounds including carbonyl compounds, mixed cyclopentadienylcarbonyl compounds; or aromatic complexes of the transition metals Fe or Mn, in solutions miscible with the liquid fuel, characterized by adding a reducing agent in metered amounts into the firebox of the plant by way of a boiler metering system with the use of a fluid carrier stream in the form of an aqueous solution of urea or also urea precursors, including ammonia or ammonium carbonate, which can also contain further ingredients, including alkanols, alkanecarboxylic acids, alkanals, or alkanones.

2. A process according to claim 1, characterized by using heavy fuel oil at the fuel.

3. A process according to claim 1, characterized in that the chemical compounds affecting the combustion process are introduced in the form of solutions miscible with the liquid fuel without a miscibility gap by way of a burner metering system controlled in response to at least one of the load and the emissions.

4. A process according to claim 1, characterized in that an aqueous urea solution is added in metered amounts as the reducing agent, this solution being diluted in the boiler metering system to 20-0.5% by weight of urea.

5. A process according to claim 1, characterized in that the addition of the reducing agent into the firebox is introduced into the firebox, as well as the concentration of the reducing agent.

6. A process according to claim 5, characterized in that the boiler metering system is controlled by means of metering lances for the reducing agent, movable in the firebox with reference to the burner positions.

7. A process according to claim 5, characterized in that the reducing agent is injected so that, in dependence on the load condition of the furnace plant, the $NO_x$ content of the waste gases is minimized with at least one of a given carbon black content and a dust content.

8. A process according to claim 1, characterized in that an aqueous urea solution is added in metered amounts as the reducing agent, this solution being diluted in the boiler metering system to 10-2% by weight of the urea.

* * * * *